United States Patent [19]
Mattson

[11] 3,837,148
[45] Sept. 24, 1974

[54] APPARATUS FOR FILTERING FLUE GAS

[75] Inventor: Tauno O. H. Mattson, Denver, Colo.

[73] Assignee: Texaco Inc., New York, N.Y.

[22] Filed: Feb. 23, 1972

[21] Appl. No.: 228,583

[52] U.S. Cl.............. 55/234, 55/243, 55/351, 55/408, 55/430
[51] Int. Cl............................ B01d 33/02
[58] Field of Search....... 55/96, 227, 233, 234, 242, 55/351, 408, 430, 243

[56] References Cited
UNITED STATES PATENTS

| | | | |
|---|---|---|---|
| 282,994 | 8/1883 | Laycock et al. | 55/234 |
| 3,266,784 | 8/1966 | Saito | 55/234 X |
| 3,455,821 | 7/1969 | Aremaa | 55/96 X |
| 3,615,248 | 10/1971 | Holler, Jr. | 55/242 X |

FOREIGN PATENTS OR APPLICATIONS

| 109,855 | 4/1900 | Germany | 55/234 |
|---|---|---|---|

Primary Examiner—Frank W. Lutter
Assistant Examiner—William Cuchlinski, Jr.
Attorney, Agent, or Firm—T. H. Whaley; C. G. Ries

[57] ABSTRACT

Flue gas filtering apparatus. It provides structure for having a continuous backwash of the filter by liquid flowing through an immersed portion to remove filtered material without changing the filter. The filter is arranged to rotate into a liquid bath with the flue gas flowing above the surface thereof.

2 Claims, 2 Drawing Figures

PATENTED SEP 24 1974

3,837,148

APPARATUS FOR FILTERING FLUE GAS

BACKGROUND OF THE INVENTION

1. Field of the Invention

This invention concerns gas filters in general and, more specifically, relates to a filter for use with flue gases and the like.

2. Description of the Prior Art

While it is known to provide a gas filter that is washed in a liquid bath, there has been no known concept that is directly applicable to filtering of flue gases and the like where the filter is continually backwashed by a cleaning liquid. Consequently, it is an object of this invention to provide a simple yet highly effective method and apparatus for flue-gas filtering.

SUMMARY OF THE INVENTION

Briefly, this invention concerns a method of filtering flue gases and the like. Such method comprises the steps of passing said gas through a portion of a moving filter in a predetermined direction, and wetting and cleaning said filter by passing a liquid through another portion thereof in the opposite direction from said gas flow.

Again briefly, the invention concerns a fluegas filter. It comprises, in combination, a cylindrical chamber having the axis thereof horizontal, and a circular filter which substantially fills the inside of said cylindrical chamber. It also comprises a shaft for rotating said filter about its axis coaxially with said cylindrical chamber. It also comprises a body of liquid which fills the other portion of said chamber, and a first inlet for said flue gas to said chamber on one side of said filter which is located above the surface of said body of liquid. It also comprises a first outlet for said flue gas from said chamber on the other side of said filter which is also located above the surface of said body of liquid, and a second inlet for said liquid into said chamber on said other side of said filter. The latter is for circulating clean liquid into the chamber for providing opposite flow through said filter from the direction of flow of said flue gas. It also comprises a second outlet for said liquid from said chamber on said one side of said filter for circulating out filtered material containing liquid in order to permit removal of such material from the liquid. The said filter has a substantial axial thickness for supporting a body of filter material.

BRIEF DESCRIPTION OF THE DRAWINGS

The foregoing and other objects and benefits of the invention will be more fully set forth below in connection with the best mode contemplated by the inventor of carrying out the invention, and in connection with which there are illustrations provided in the drawings, wherein.

DESCRIPTION OF THE PREFERRED EMBODIMENTS

In the art of flue-gas filtering, a common problem concerns the need to dispose of filtered material that is removed from the flue gases. While some sophisticated arrangements provide for such filtered-material removal, these are quite costly so that there is resistance against their use. This invention provides for a simple yet effective method and/or apparatus to effect filtering with continual removal of filtered materials.

Figure 1:
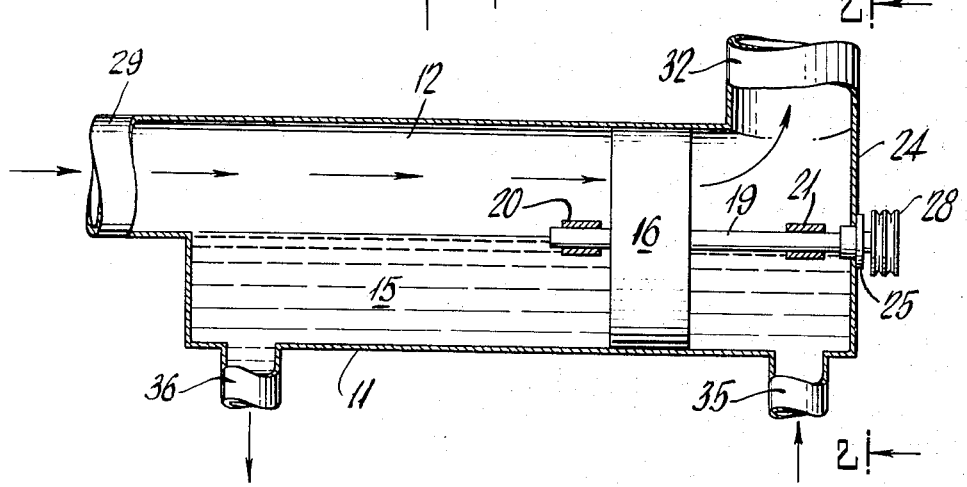
FIG. 1 is a side elevation partially broken away in cross-section, showing apparatus according to the invention.
Figure 2:
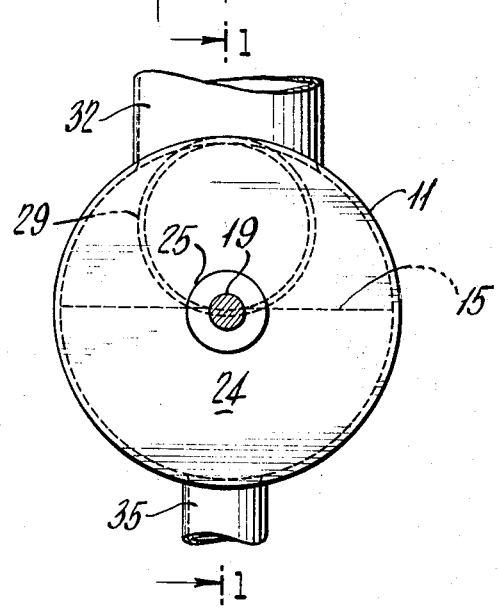
FIG. 2 is an end elevation taken along the lines 2—2 of FIG. 1.

Referring both to FIG. 1 and FIG. 2, it will be noted that there is a schematic showing of a preferred embodiment of the filter. There is a cylindrical body 11 that has a cylindrical chamber 12 therein. Chamber 12 contains a body of liquid 15 which fills the lower half of the chamber 12.

Inside the chamber 12, preferably located near the gas-exhaust end, there is a circular filter 16. It has considerable axial thickness so that it can contain and/or support any feasible filtering material, e.g., fiberglas or the like (not shown).

The filter substantially fills the entire inner cross-sectional area of the chamber 12, and it is mounted for rotation with a shaft 19. The shaft may be supported in any feasible manner, such as by means of two bearings 20 and 21. The shaft 19 is situated coaxially with the cylindrical body 11 of the filter structure, and it extends out through an end wall 24 of the body 11. There is a seal 25 where the shaft goes through the wall 24, in order to keep the liquid as well as the gas in the chamber 12 from leaking through the end wall 24. Also, there is a pulley 28 attached to the end of the shaft 19 for providing the means to rotate the shaft when the filter is in use.

At the other end of the chamber 12 from the end wall 24, there is an inlet pipe or duct 29 that carries the flue gas or other gas to be filtered. This pipe joins the interior of the body 11 above the center thereof so that the body of liquid 15 will be retained while the inlet gases may flow into chamber 12 above the surface of the liquid 15.

At the other end of the chamber 12 from pipe 29, there is an outlet pipe or duct 32 that carries the filtered flue gases to exhaust. This is preferably connected into the chamber 12 in a vertical manner, as illustrated, so that the flue gases may rise in the usual manner and flow out of a stack (not shown).

Connected into the lower portion of the body 11 is an inlet pipe 35 near one end thereof, and an outlet pipe 36 near the other end. These are provided to permit circulation of the liquid 15 through the lower portion of the filter 16 in a direction opposite to the flow of the flue gases which is taking place above the liquid. In this manner the filter 16 may be continuously rotated while the fluid, i.e., liquid 15, is circulated for backwashing or cleaning the filter and removing filtered materials.

It will be appreciated that any feasible arrangement (not shown) may be employed for cleaning the liquid 15. The accumulated filtered material which may include soluble gases, will be transported in the circulating liquid 15 out through the pipe 36. Then the filtered-out material may be recovered or disposed of in any feasible manner (not shown). Thereafter, there will be recirculation of clean liquid through the filter.

It will be appreciated that the method according to this invention might be carried out by various different arrangements which are not necessarily mere mechanical equivalents of one another.

The steps of the method include at least the following, although they may not necessarily be carried out in the order recited.

Step 1 is that of passing flue gas or the like through a portion of a moving filter in a predetermined direction. It will be understood that this step might include more or less forced flow of the gas. Thus, there could be pumping or blowing thereof, although it might be only necessary to have the flow created by natural draft conditions. The moving filter preferably has a circular structure, although it need not be limited thereto.

Step 2 comprises the wetting and cleaning of the filter by passing a liquid through a separate portion thereof in the opposite direction from the gas flow. It will be noted that this step may be carried out by pumping a liquid through the filter while it is being rotated. Thus, the filter has one portion with the gas flowing through and being filtered, while the remainder has the liquid traveling through in the opposite direction. Here again, there may be various structures or arrangements employed that are not necessarily mere mechanical equivalents of the illustrated structure.

While the foregoing embodiments of the invention have been described above in considerable detail in accordance with applicable statutes, this is not to be taken as in any way limiting the invention, but merely as being descriptive thereof.

What I claim is:

1. A flue-gas filter, comprising in combination an open cylindrical chamber having an axis thereof horizontal, a circular filter located in said chamber, a shaft for supporting and for rotating said filter about its axis, said filter being located coaxially with said cylindrical chamber, a body of liquid filling the lower portion of said chamber, a first inlet for said flue gas at one end of said chamber on one side of said filter and above the surface of said body of liquid, a first outlet for said flue gas at the other end of said chamber on the other side of said filter and above the surface of said body of liquid, a second inlet for said liquid connected to the bottom of said chamber at said other end of said chamber for circulating clean liquid into the chamber for opposite flow through said filter from the direction of said flue gas, and a second outlet for said liquid connected to the bottom of said chamber at said one end of said chamber for circulating out filtered material containing liquid for removal of such material from said liquid, said open chamber being unobstructed along its length except for said filter and said shaft and providing unobstructed flow path for said liquid through the immersed portion of said filter in the opposite direction from the flow of the flue gas through the filter above the liquid.

2. A flue-gas filter according to claim 1, wherein said filter substantially fills the inside of said cylindrical chamber, and said filter has axial thickness for supporting a body of filter material.

* * * * *